US012599106B2

(12) United States Patent
Hetzenauer

(10) Patent No.: US 12,599,106 B2
(45) Date of Patent: Apr. 14, 2026

(54) DEVICE FOR PICKING UP ANIMAL EXCREMENT

(71) Applicant: HETWIN Automation Systems GmbH, Langkampfen (AT)

(72) Inventor: Josef Hetzenauer, Langkampfen (AT)

(73) Assignee: HETWIN AUTOMATION SYSTEMS GMBH, Langkampfen (AT)

( * ) Notice: Subject to any disclaimer, the term of this patent is extended or adjusted under 35 U.S.C. 154(b) by 0 days.

(21) Appl. No.: 18/202,114

(22) Filed: May 25, 2023

(65) Prior Publication Data

US 2023/0371466 A1 Nov. 23, 2023

Related U.S. Application Data

(63) Continuation of application No. PCT/AT2021/060373, filed on Oct. 13, 2021.

(30) Foreign Application Priority Data

Nov. 26, 2020 (AT) .............................. A 51034/2020

(51) Int. Cl.
*A01K 1/01* (2006.01)

(52) U.S. Cl.
CPC .......... *A01K 1/0139* (2013.01); *A01K 1/0103* (2013.01)

(58) Field of Classification Search
CPC ............................ A01K 1/0103; A01K 1/0139
See application file for complete search history.

(56) References Cited

U.S. PATENT DOCUMENTS 6,564,535 B1 * 5/2003 Nafziger .............. A01D 61/008
198/666
6,820,358 B1 * 11/2004 Huelsewiesche ......... E02F 7/02
172/123
(Continued)

FOREIGN PATENT DOCUMENTS

CN 204907456 12/2015
CN 208708385 4/2019
(Continued)

OTHER PUBLICATIONS

Machine Translation of DE-102014109931-A1, Bayard C, Jan. 21, 2016 (Year: 2016).*

(Continued)

*Primary Examiner* — Kimberly S Berona
*Assistant Examiner* — Katherine June Walter
(74) *Attorney, Agent, or Firm* — Wenderoth, Lind & Ponack, L.L.P.

(57) ABSTRACT

A device for picking up animal excrement includes a propulsion device for propelling the device, a pick-up device with a worm housing and a drivable conveyor worm arranged in the worm housing and which extends in a longitudinal direction to pick up animal excrement on the ground. The conveyor worm includes, along its longitudinal extent, a first conveyor section with a first conveying direction and a second conveyor section with a second conveying direction, and the second conveying direction runs counter to the first conveying direction. A collecting device collects the animal excrement picked up by the pick-up device, and the collecting device is connected to an outlet opening of the worm housing, arranged between the first and second conveyor section. The worm housing has a first pick-up opening in the region of the first conveyor section and a second (Continued)

pick-up opening in the region of the second conveyor section.

31 Claims, 5 Drawing Sheets

(56) References Cited

U.S. PATENT DOCUMENTS

| | | | |
|---|---|---|---|
| 7,984,529 B2 | 7/2011 | Mainini | |
| 8,601,637 B2 | 12/2013 | Mainini | |
| 11,259,498 B2 | 3/2022 | Xu | |
| 2008/0173247 A1 | 7/2008 | Mainini | |
| 2011/0247566 A1 | 10/2011 | Mainini | |
| 2019/0166788 A1 | 6/2019 | Xu | |
| 2020/0307916 A1 * | 10/2020 | Schröder | B65G 21/12 |

FOREIGN PATENT DOCUMENTS

| | | | | |
|---|---|---|---|---|
| CN | 208708385 U | * | 4/2019 | |
| CN | 111406656 | | 7/2020 | |
| CN | 211091196 | | 7/2020 | |
| CN | 212414218 | | 1/2021 | |
| DE | 40 27 125 | | 6/1991 | |
| DE | 20 2011 050 205 | | 9/2011 | |
| DE | 102014109931 A1 | * | 1/2016 | A47L 11/4008 |
| EP | 2 484 205 | | 8/2012 | |
| WO | WO-2010095930 A1 | * | 8/2010 | A01K 1/0029 |

OTHER PUBLICATIONS

Machine Translation of CN-208708385-U, Liu Tao, Apr. 9, 2019 (Year: 2019).*

Machine Translation of CN-111406656-A, Ren, Chong-yi, Jul. 14, 2020 (Year: 2020).*

International Search Report issued Jan. 12, 2022 in International (PCT) Application No. PCT/AT2021/060373.

* cited by examiner

DEVICE FOR PICKING UP ANIMAL EXCREMENT

BACKGROUND OF THE INVENTION

The present invention relates to a device for picking up animal excrement, in particular manure and/or muck and/or slurry.

For animal excrement, so-called slurry channels with slatted floor are often built into modern livestock buildings. The manure and the slurry fall through the gaps and collect in the channel. However, these systems are very expensive to purchase. On the one hand, the earth moving and concrete work and, on the other hand, the slatted segments are very costly. In addition, the slats must be cleaned regularly, e.g. by hand or with the aid of a cleaning device formed specifically for this (so-called slatted floor cleaning robot). Sheds with a solid concrete floor without slurry pit are much simpler and cheaper. Existing tie stalls, which are increasingly being converted to loose-housing systems, in most cases also do not have pits underneath. It is complex and cost-intensive to modify the tie stalls to have slurry channels with slatted floor. A solid concrete slab is likewise to be preferred here for cost reasons.

To pick up animal excrement in livestock buildings which do not have slurry channels with slatted floor, but instead have a traversable ground surface (for example a solid concrete floor), devices are already known which comprise a propulsion device for propelling the device on a traversable ground surface (see e.g. CN 111406656 A, CN 204907456 U, DE 20 2011 050 205 U1, DE 40 27 125 A1).

The devices according to CN 111406656 A or CN 204907456 U furthermore comprise at least one pick-up device with a screw housing and with at least one drivable screw conveyor arranged in the screw housing and extending in a longitudinal direction for picking up animal excrement located on the ground surface. Along its longitudinal extent, the screw conveyor comprises a first conveyor section with a first conveying direction and a second conveyor section with a second conveying direction, and the second conveying direction runs counter to the first conveying direction. Moreover, these devices comprise a collection device for collecting the animal excrement picked up by the at least one pick-up device, in which the collection device is connected to an outlet opening of the screw housing arranged between the first conveyor section and the second conveyor section. Because the screw housing of these devices is formed as a housing that is open to the front and bottom (CN 111406656 A) or as a shovel that is open to the front and top (CN 204907456 U), however, with these devices the animal excrement (in particular in the case of liquid muck or slurry) is not reliably picked up and conveyed to the collection device.

SUMMARY OF THE INVENTION

The object of the invention is to specify a device for picking up animal excrement that is improved compared with the state of the art. In particular, the picking-up of animal excrement and the conveying to the collection device are to be improved with the proposed device.

In the invention, the screw housing is formed closed, wherein the screw housing has a first pick-up opening in the area of the first conveyor section and a second pick-up opening in the area of the second conveyor section.

Through this design of the at least one pick-up device, in which the screw conveyor equipped with two counter-rotating conveyor sections is arranged in a screw housing that is closed in the area of the conveyor sections except for the outlet opening and pick-up openings, the animal excrement can be very reliably picked up from the ground surface. Moreover, through this arrangement, a pressure is generated in the screw housing, whereby a reliable conveying of the animal excrement picked up is effected starting from the screw housing through the outlet opening to the collection device.

The at least one pick-up device can be arranged on the front side of the device in a direction of travel of the device. The at least one screw conveyor can be driven in a manner known per se by a drive unit (e.g. geared motor), with the result that the at least one screw conveyor rotates and the animal excrement picked up via the first pick-up opening and the second pick-up opening is transported inside the screw housing to the outlet opening by means of the two conveyor sections working in opposite directions.

The screw conveyor can preferably rotate at a rotational speed in a range of from approximately 20 rpm to approximately 200 rpm, particularly preferably approximately 70 rpm to approximately 120 rpm.

Preferably, the screw housing is formed tubular. This makes it possible to construct the at least one pick-up device in a structurally simple manner.

According to a preferred embodiment, the first pick-up opening and the second pick-up opening are arranged at end areas of the screw housing, wherein the outlet opening is preferably arranged in a central area of the screw housing. The first pick-up opening and the second pick-up opening are located at the front of the screw housing in the direction of travel of the device. Through the conveyor sections working in opposite directions, the animal excrement is conveyed from both sides in each case from the outside to the center, where the outlet opening is located. The outlet opening is preferably located at the back of the screw housing in the direction of travel of the device, wherein the front area of the screw housing opposite the outlet opening is closed. Through the lateral feed of the excrement into the central area, which is closed at the front in the direction of travel, a positive pressure is generated in this area of the screw housing and at the same time a negative pressure is generated towards the back, and thus both liquid manure-muck mixture and drier manure-muck mixture can be picked up reliably. Moreover, the animal excrement picked up can thereby be conveyed further to the collection device via the outlet opening by the pressure being generated in the screw housing alone.

Preferably, the first pick-up opening extends, starting from a start of the first conveyor section, along approximately 20% to approximately 80%, preferably approximately 50% to approximately 70%, of the first conveyor section and/or the second pick-up opening extends, starting from a start of the second conveyor section, along approximately 20% to approximately 80%, preferably approximately 50% to approximately 70%, of the second conveyor section.

A closed area (with the exception of the outlet opening) is located between the first pick-up opening and the second pick-up opening. The closed area can extend into the first conveyor section and/or the second conveyor section until it overlaps at least one screw pitch of the first conveyor section and/or one screw pitch of the second conveyor section. A high feed pressure can thereby be built up in the area of the outlet opening, with the result that the animal excrement can be efficiently conveyed to the collection device.

According to an embodiment variant, an opening height of first pick-up opening and/or second pick-up opening corresponds to approximately 30% to approximately 100%, preferably approximately 50% to approximately 70%, of a housing height of the screw housing.

In a particularly preferred embodiment, at least one slide device, preferably in the form of a skid, is arranged on the screw housing. The at least one slide device can overhang the screw housing in the direction of the ground surface, with the result that the screw housing can slide on it on the ground surface.

According to an embodiment, at least one, preferably pointed, guide device for feeding the animal excrement to be picked up to the first pick-up opening and/or second pick-up opening is arranged on the screw housing between first pick-up opening and second pick-up opening.

Moreover, guide mechanisms arranged at an angle to the screw housing are arranged at the ends of the screw housing.

The guide device and the guide mechanisms can be arranged at the front of the screw housing in the direction of travel of the device, in order to guide the animal excrement to be picked up to the first pick-up opening and second pick-up opening.

According to a preferred embodiment variant, a, preferably tubular, conveyor pipe connects the outlet opening to the collection device. Through the proposed construction of the at least one pick-up device and the associated pressure build-up in the closed screw housing, an additional conveyor mechanism in the conveyor pipe can be dispensed with. To support the conveying of the animal excrement from screw housing to collection device, however, an additional conveyor mechanism (e.g. a further screw conveyor) can of course be arranged in the conveyor pipe.

Preferably, the collection device comprises at least one conveyor device, preferably in the form of a screw. Thus, for example, at least one screw system, which constantly conveys the animal excrement picked up and conveyed to the collection device towards the back in order to make optimum use of the storage space of the collection device, can be arranged in the collection device, which can form the "belly" of the device.

In order to be able to detect the fill level in the collection device, the collection device comprises at least one fill-level sensor. This can be a pressure sensor.

To empty the collection device, the collection device preferably has at least one emptying opening which can be sealed by a cover, wherein the cover can preferably be acted on by an actuator, preferably in the form of a spring or a cylinder. Thus, a cover closed with spring pressure, which is closed in normal operation, can preferably be provided on the floor of the collection device. While the device is being driven into an emptying station, the cover can be pressed open and the collection device can thus be emptied. Another conveyor device (e.g. in the form of a screw), possibly arranged in the collection device, can additionally be running and the inner area of the collection device can optionally be rinsed with water. At the emptying station, the animal excrement can be emptied into a channel or directly into a slurry pit. As an alternative or in addition to the spring, a hydraulic, pneumatic or electric cylinder can also be provided, for example, as actuator in order to open and close the cover.

For this purpose, the device can comprise at least one water tank. The water tank or tanks can be attached to the outside of the device.

The collection device can comprise at least one rinsing mechanism connected to the at least one water tank for rinsing the collection device. The inner area of the collection device can thus be cleaned while the collection device is being emptied.

Preferably, the device comprises at least one spraying mechanism, preferably in the form of a spray nozzle, connected to the at least one water tank for applying water to the ground surface. Thus, for example, at the front and back of the device in each case a spray bar can be arranged which sprays the water from the at least one water tank over the width of the device uniformly onto the ground surface or floor, whereby it is made easier to pick up the animal excrement.

According to a particularly preferred embodiment, the device comprises a detection device for detecting the quantity of animal excrement to be picked up. The detection device can be formed in the form of a flap arranged movably on the device, which is arranged above the first pick-up opening and the second pick-up opening and extends in front of the first pick-up opening and the second pick-up opening. The movable flap can be arranged in front of and above the at least one pick-up device in the direction of travel of the device and can extend substantially over the entire length of the pick-up device (or width of the device). If the animal excrement cannot be picked up to a sufficient degree or quickly enough by the at least one pick-up device, the movable flap is pushed up. The movement of the flap can be detected and a control intervention can be effected such that the device for example drives more slowly or the at least one screw conveyor of the pick-up device rotates more quickly. The extent of the upward pivoting of the movable flap can equally also be detected, with the result that, for example, a safety shutdown of the device can be effected if the flap is opened beyond a certain angle by an obstacle located in front of the device.

In a preferred embodiment, the device comprises at least one energy storage device, preferably in the form of an accumulator, for power supply.

Preferably, the propulsion device comprises at least two drivable drive wheels. In a simple manner, it can thereby be made possible to propel and steer the device.

Each of the drive wheels can be drivable via a drive motor, wherein each drive motor is preferably equipped with an incremental encoder. A path length measurement of the path driven by the device can be carried out due to the provision of incremental encoders. The drive motors can be geared motors, for example.

Preferably, the propulsion device comprises a control device for controlling the at least two drive wheels.

At least one predefined or predefinable movement path can be stored in the control device, wherein the control device is configured to control the at least two drive wheels depending on the at least one movement path. In other words, it can hereby be made possible for the device to drive on the ground surface to be treated along predefined or predefinable movement paths in an autonomous or self-driving manner. The movement paths can be predefined in a computer-assisted manner on the basis of plan data for a livestock building which is to be cleaned of animal excrement with the aid of the device.

According to a particularly preferred embodiment, the propulsion device comprises at least one navigation mechanism, and predefined or predefinable position data can be stored in the control device. The control device is configured to control the at least two drive wheels depending on the position data and on navigation data of the at least one navigation mechanism. A position-dependent navigation of the device is thus made possible. The at least one navigation mechanism can be a navigation mechanism based on a satellite-supported navigation system such as GPS, GLO-NASS, GALILEO, etc. Alternatively or additionally, however, it can also be a navigation mechanism based on an indoor navigation system which uses, for example, WLAN or Bluetooth for position determination. Through a position-dependent control of the propulsion device, specific positions or position paths can be predefined, which can be driven to or on autonomously by the device.

In a preferred embodiment, the position data comprise at least one route. Thus, one or more routes for the device can be stored in the control device and the control device can, in conjunction with the navigation mechanism, ensure that the device autonomously drives on the predefined route(s).

Preferably, the position data comprise at least one parking position and/or at least one charging position and/or at least one water-supplying position and/or at least one emptying position. Through the predefining of corresponding position data, the device can autonomously drive to the respective positions and for example perform an emptying of the collection device, pick up fresh water or recharge the energy storage device. The different position data are allocated to the same or different locations. Thus, the position data of parking position and charging position can be allocated to one and the same location, whereas charging position and emptying position should be assigned to different locations for safety reasons, as manipulations on the energy system of the device should not be performed in the emptying position because of outgassing. In the parking position, for example, an automatic charging of energy storage devices and/or an automatic filling of water tanks can be effected. For this purpose, a charging station, which provides a charging voltage (e.g. 24 V) for a charging device integrated in the device for charging energy storage devices (e.g. accumulators) of the device via a connection device (e.g. two slide rails), can be provided in the parking position (or another position). A water-loading station, which preferably automatically docks with the device and fills water tanks of the device, can also be provided in the parking position (or another position).

In a further embodiment, at least one distance sensor is arranged on the device. This can be, for example, ultrasonic sensors, which are arranged on the left and right of the device and serve to detect the lateral distances of the device from the surroundings. If the device drives on a predefined (e.g. by means of a programming on a PC) movement path or route, the distance sensors can serve to check the distance that, according to the programming, the device is to have for example from a wall or an upstand of a cubicle for cows.

In a particularly preferred embodiment, at least one contact sensor is arranged on the device. This can be, for example, mechanical sensors (e.g. pressure sensors or switches), which are arranged at the front of the device in the direction of travel on the outside left and right. These sensors can also be used to orient the device, for example if the device is feeling its way along a wall or upstand of a cubicle. If the device, for example, drives into a wall or upstand at the end of a walkway of a livestock building, the contact sensors are actuated and the device thereby recognizes that the end of this movement section has been reached. The device can then turn in a predefined (e.g. by means of a programming on a PC) direction and continue the journey.

To orient the device, a gyroscope can also be provided in order to be able to detect an undesired or unexpected rotating movement (e.g. if a cow bumps into the device or knocks it off the path) and counteract this accordingly.

To orient the device, a sensor strip can be aligned towards the ground surface, and the sensor chip can recognize magnets and/or RFID chips built into the ground surface, is arranged on the device. Thus, magnets or RFID chips or similar markings detectable by the sensor strip, which are recognized by the sensor strip and thus additionally serve as reference points for orientation, can be drilled at predefined or random distances along the planned movement path or route of the device.

A movement path or route of the device can, for example, be predefined via a route programming on a PC. This can be effected on the basis of a livestock building plan, in which the walkways or the surfaces to be mucked out are visible. Desired position data (e.g. at least one parking position and/or at least one charging position and/or at least one water-supplying position and/or at least one emptying position) can be marked in the plan. Moreover, routes on which the device is to drive can be marked in the plan. It can also be taken into account that there can be areas in which more animal excrement accumulates and which are therefore to be traversed more often. As a supplement, predefined times can also be entered, with the result that it is possible to define when the device is to drive on the routes and when it pauses (e.g. in a charging position in order to charge its energy storage devices). The programmed data can then be transmitted to the control device of the device, for example via a wireless connection such as WLAN or via a storage medium (e.g. SD card) with data located thereon.

The device can then drive on the programmed-in movement paths or routes and collect the animal excrement several times a day at the programmed-in times. It can be provided that the device automatically drives to an emptying position if the collection device exceeds a predefinable fill level. After the emptying, the device can return to the last position in the movement path or route again and continue with the treatment of the livestock building.

Corresponding processes can be provided if possibly present energy storage devices fall below a predefinable state of charge or if possibly present water tanks fall below a predefinable fill level.

BRIEF DESCRIPTION OF THE DRAWINGS

Further details and advantages of the present invention are explained with reference to the following description of the figures, in which.

DETAILED DESCRIPTION OF THE INVENTION

Figure 1:
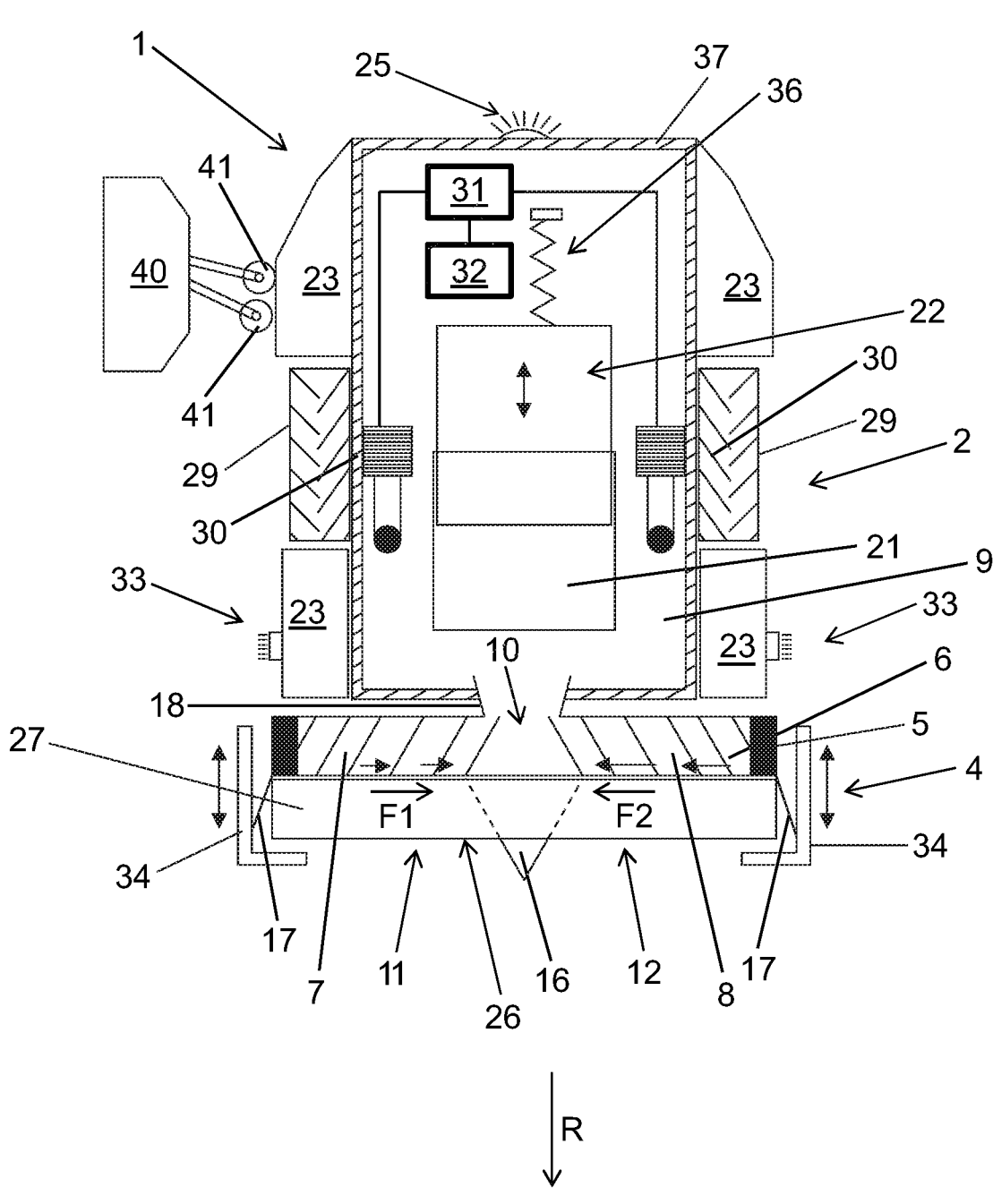
FIG. 1 is a sectional representation of a top view of an embodiment of a proposed device for picking up animal excrement.
Figure 2:
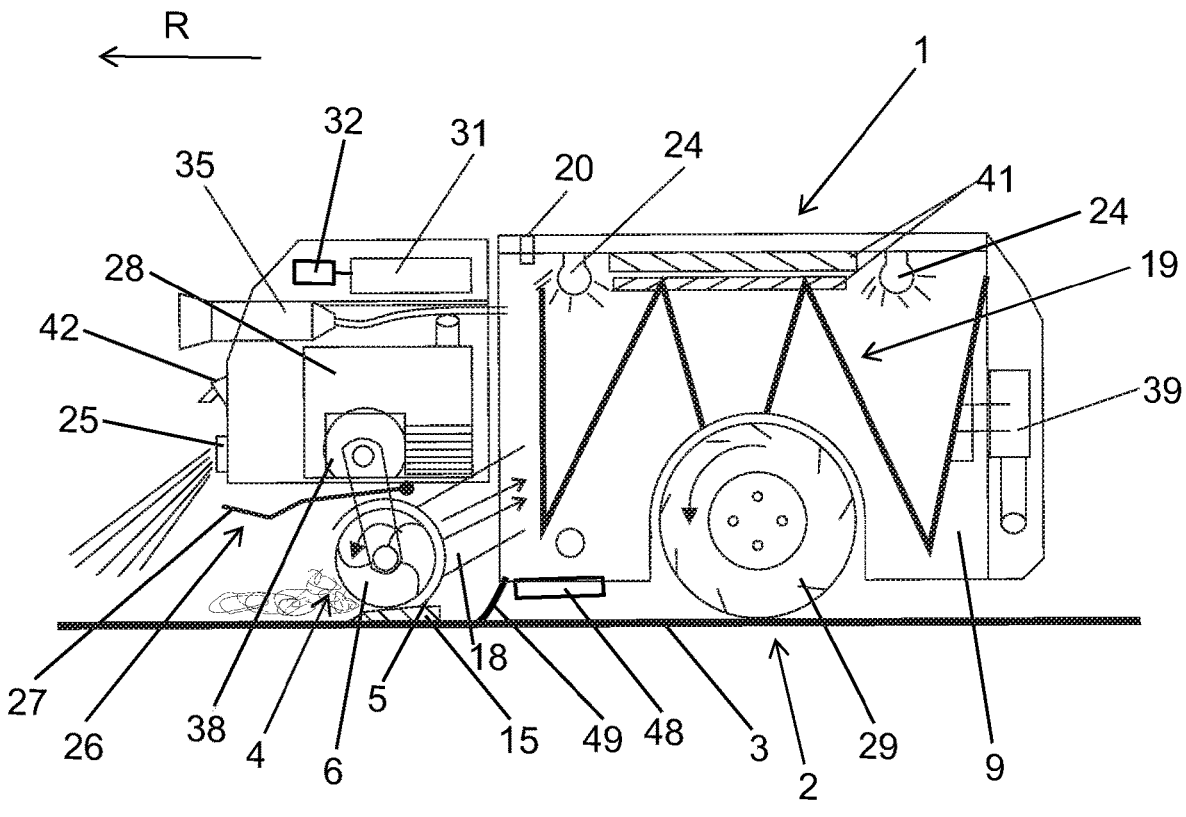
FIG. 2 is a sectional representation of a side view of the device according to FIG. 1.

FIG. 1 shows a sectional representation of a top view of an embodiment of a proposed device 1 for picking up animal excrement, and FIG. 2 shows a sectional representation of a side view of the device 1.

The device 1 comprises a propulsion device 2 for propelling the device 1 on a traversable ground surface 3 from which the animal excrement is to be picked up. The propulsion device 2 of the device 1 shown comprises two drive wheels 29 arranged on the left and right of the device 1, which are in each case driven by a drive motor 30 in the form of a geared motor. In a simple manner, it can thereby be made possible to propel and steer the device 1. To control the drive wheels 29 the propulsion device 2 moreover comprises a control device 31, schematically represented. For a navigation-based control of the drive wheels 29 the propulsion device 2 additionally comprises a navigation mechanism 32, likewise only schematically represented. Position data (e.g. route, parking position, charging position, water-supplying position, emptying position) for the device 1 can be stored in the control device 31 and the control device 31 can, in conjunction with the navigation mechanism 32, ensure that the device 1 autonomously drives to or on the predefined position data by controlling the drive wheels 29 depending on the position data and on navigation data of the navigation mechanism 32.

Moreover, a sensor strip 48 aligned towards the ground surface 3 is arranged on the device 1. The sensor strip can recognize magnets and/or RFID chips (not represented here) built into the ground surface 3, which additionally serve as reference points for orientation.

For power supply, the device 1 comprises energy storage devices 28 in the form of accumulators, which can be charged via slide rails 41 of a charging station 40.

The device 1 moreover comprises a pick-up device 4 with a screw housing 5 and with at least one drivable screw conveyor 6 arranged in the screw housing 5 and extending in a longitudinal direction for picking up animal excrement located on the ground surface 3. The pick-up device 4 is arranged on the front side of the device 1 in a direction of travel R of the device 1. Along its longitudinal extent, the screw conveyor 6 comprises a first conveyor section 7 with a first conveying direction F1 and a second conveyor section 8 with a second conveying direction F2, wherein the second conveying direction F2 runs counter to the first conveying direction F1.

To collect the animal excrement picked up by the pick-up device 4, the device 1 comprises a collection device 9. The collection device 9 is connected to an outlet opening 10 of the screw housing 5 arranged between the first conveyor section 7 and the second conveyor section 8 via a tubular conveyor pipe 18.

The screw housing 5 is in principle formed closed, wherein it has a first pick-up opening 11 in the area of the first conveyor section 7 and a second pick-up opening 12 in the area of the second conveyor section 8.

The screw conveyor 6 is driven by a drive unit 38 in the form of a geared motor, with the result that the screw conveyor 6 rotates and the animal excrement picked up via the first pick-up opening 11 and the second pick-up opening 12 is transported inside the screw housing 5 to the outlet opening 10 by means of the two conveyor sections 7, 8 working in opposite directions.

Through the lateral feed of the excrement from the outside to the center of the screw housing 5, where the outlet opening 10 is located, a positive pressure is generated in this area of the screw housing 5 and at the same time a negative pressure is generated towards the back. Thus. the animal excrement picked up can be conveyed further to the collection device 9 via the outlet opening 10 and the conveyor pipe 18 by the pressure being generated in the screw housing 5 alone.

At the ends of the screw housing 5 of the pick-up device 4, slide devices 15 in the form of skids are arranged at the bottom, on which the device 1 can be supported against the ground surface 3 and which make a low-friction propulsion of the device 1 possible.

A pointed guide device 16 for feeding the animal excrement to be picked up to the first pick-up opening 11 and second pick-up opening 12 is arranged on the screw housing 5 between the first pick-up opening 11 and the second pick-up opening 12. In this connection, guide mechanisms 17 arranged at an angle to the screw housing 5 are additionally arranged at the ends of the screw housing 5.

Moreover, a rubber lip 49 is arranged on the underfloor of the device 1 shown. The rubber lip 49 serves to remove the residues which were not able to be picked up by the pick-up device 4. Through an arrangement of the rubber lip 49 at an angle, the residual material can be pushed to a side of the device 1 in order to be able to be picked up during an offset journey in the opposite direction.

The collection device 9 comprises a conveyor device 19 in the form of a screw, which constantly conveys the animal excrement picked up and conveyed to the collection device 9 towards the back in order to make optimum use of the storage space of the collection device 9. The conveyor device 19 is driven by a drive mechanism 39 (e.g. a geared motor). To detect the fill level, the collection device 9 moreover comprises a fill-level sensor 20, which can be a pressure sensor.

For an easier emptying of the collection device 9, the latter has an emptying opening 22 which can be sealed by a cover 21. The cover 21 is spring-loaded by a spring 36, schematically represented. While the device 1 is being driven into an emptying station, the cover 21 can be pressed open against the spring force of the spring 36 and the collection device 9 can thereby be emptied via the emptying opening 22.

The device 1 shown by example comprises four water tanks 23 attached to the outside of the device 1. To rinse out the collection device 9, the latter comprises several rinsing mechanisms 24 connected to the water tanks 23. In addition, the device 1 shown comprises spraying mechanisms 25 in the form of spray nozzles arranged at the front and back of the device 1 and connected to the water tanks 23 for applying water to the ground surface 3. To fill the water tanks 23, the device 1 can dock with a water supply via a water intake 35 attached to the device 1.

To detect the quantity of animal excrement to be picked up, the device 1 shown comprises a detection device 26 in the form of a flap 27 arranged movably on the device 1, which is arranged above the first pick-up opening 11 and the second pick-up opening 12 and extends in front of the first pick-up opening 11 and the second pick-up opening 12 in the direction of travel R.

If the animal excrement cannot be picked up to a sufficient degree or quickly enough by the pick-up device 4, the movable flap 27 is pushed up. This can be detected and a control intervention can be effected such that the device 1, for example, drives more slowly or the screw conveyor 6 of the pick-up device 4 rotates more quickly.

To detect lateral distances of the device 1 from objects in the surroundings of the device 1 (e.g. walls or upstands of cubicles), distance sensors 33 in the form of ultrasonic sensors are arranged on the side of the device 1 between the pick-up device 4 and the drive wheels 29.

Contact sensors 34 in the form of mechanical sensors are arranged at the front of the device 1 shown in the direction of travel R on the outside left and right. If the device 1, for example, drives into a wall or upstand at the end of a walkway of a livestock building, these contact sensors 34 are actuated by being moved by the jolt against the direction of travel R relative to the device 1 (this is indicated by the double arrows next to the contact sensors 34). This can be detected and the device 1 can then turn in a predefined (e.g. by means of a programming on a PC) direction and continue the journey.

For protection against frost, the device 1 is equipped with heating bands 37 in the necessary areas.

In addition, a heat sensor 42 is arranged at the front of the device 1 in the direction of travel R. This heat sensor 42, which can be, for example, an infrared sensor, serves to recognize a calf, should a cow calve unexpectedly in the cleaning area of the device 1.

Figure 3:
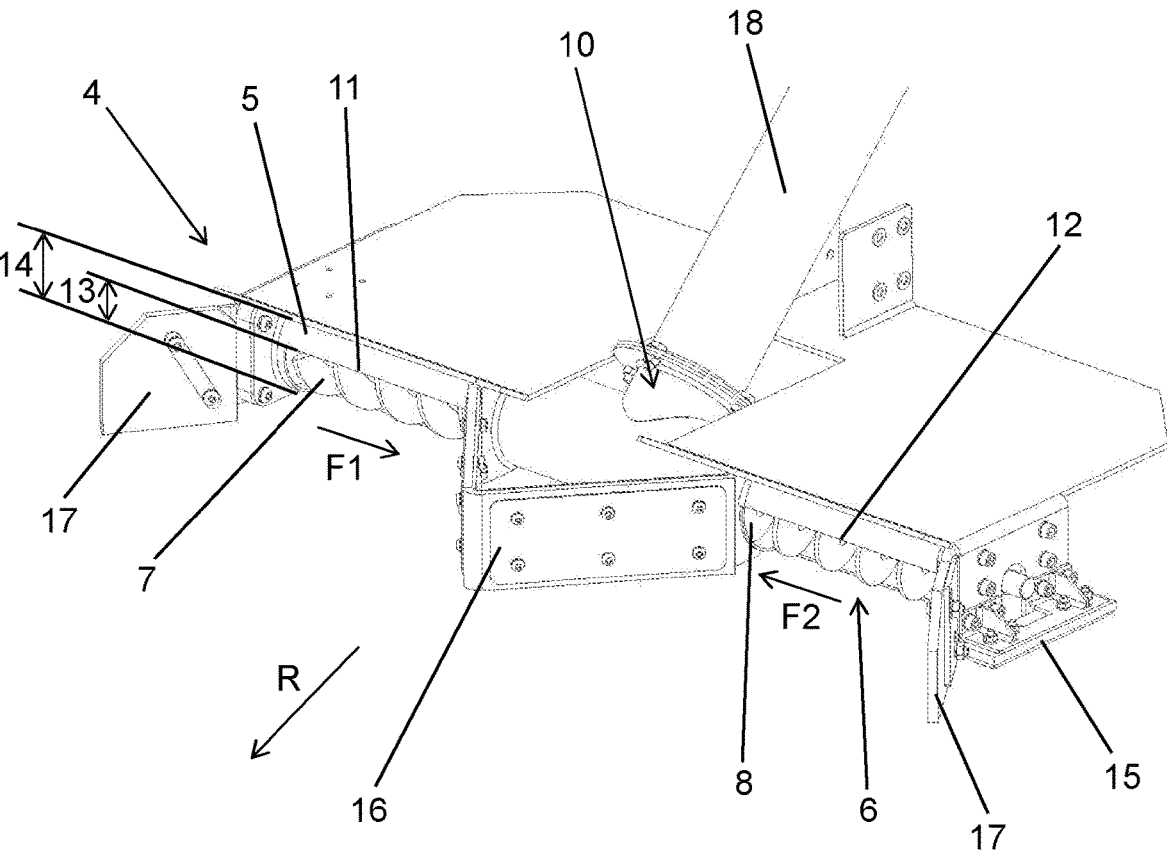
FIG. 3 is a perspective view of a pick-up device.
Figure 4:
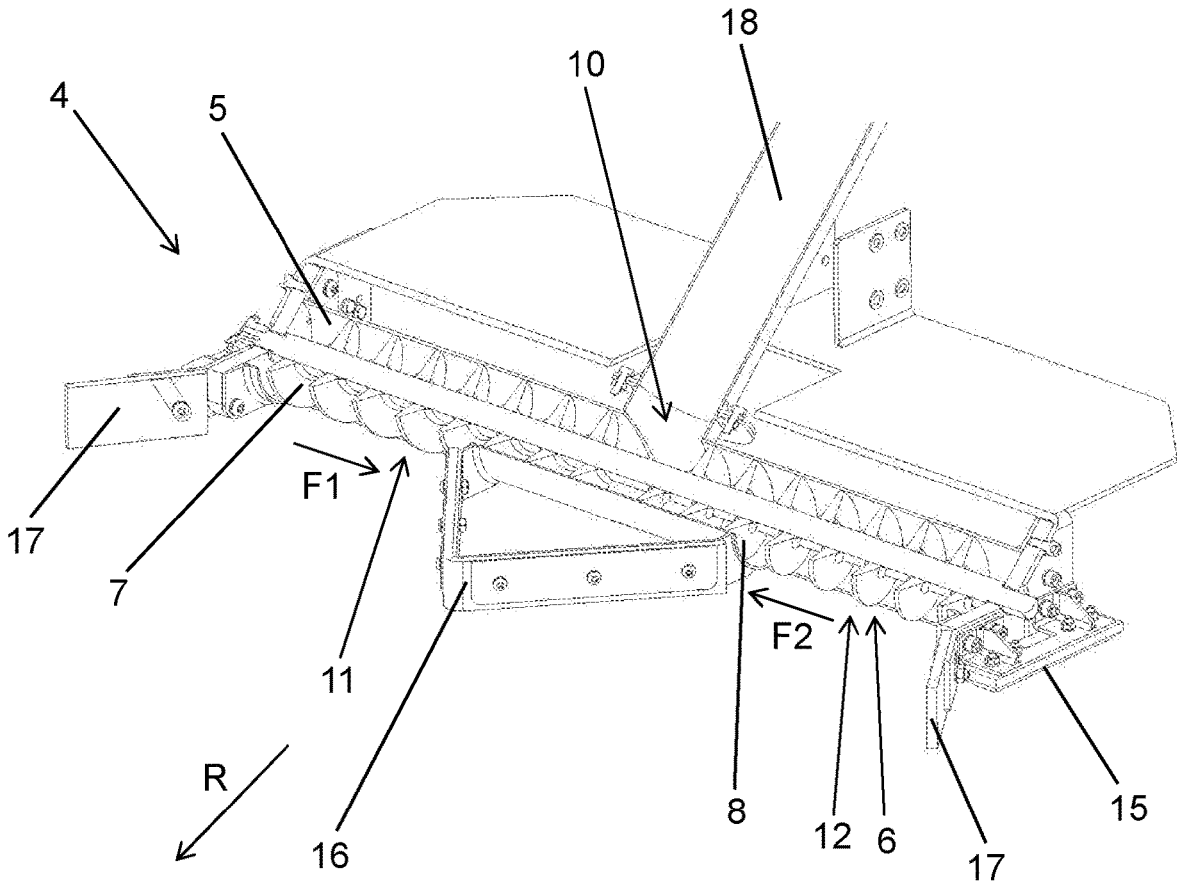
FIG. 4 is a sectional representation of the pick-up device according to FIG. 3.

FIG. 3 shows a perspective view of a pick-up device 4 of a device 1 not represented in more detail and FIG. 4 shows a sectional representation of the pick-up device 4 according to FIG. 3.

The pick-up device 4 comprises a screw housing 5 and a drivable screw conveyor 6 arranged in the screw housing 5 and extending in a longitudinal direction for picking up animal excrement. Along its longitudinal extent, the screw conveyor 6 comprises a first conveyor section 7 with a first conveying direction F1 and a second conveyor section 8 with a second conveying direction F2, wherein the second conveying direction F2 runs counter to the first conveying direction F1.

The screw housing 5 of the pick-up device 4 shown by way of example is formed tubular and comprises end plates at the ends, with the result that the screw housing 5 is formed closed except for the openings explained below.

To pick up the animal excrement, the screw housing 5, which is closed per se, has a first pick-up opening 11 in the area of the first conveyor section 7 and a second pick-up opening 12 in the area of the second conveyor section 8. The first pick-up opening 11 and the second pick-up opening 12 are located at the front of the screw housing 5 in a direction of travel R of the device 1 at end areas of the screw housing 5. The first pick-up opening 11 extends, starting from an outer start (i.e., an outer end with respect to a widthwise direction of the pick-up device) of the first conveyor section 7, along approximately 60% of the first conveyor section 7 and the second pick-up opening 12 extends, starting from an outer start (i.e., an outer end with respect to a widthwise direction of the pick-up device) of the second conveyor section 8, along approximately 60% of the second conveyor section 8. An opening height 13 of first pick-up opening 11 and second pick-up opening 12 corresponds to approximately 70% of a housing height 14 of the screw housing 5.

In the back area of the screw housing 5 in the direction of travel R, it has an outlet opening for conveying the animal excrement picked up by the pick-up device 4 further to a collection device 9 not visible in more detail here. The outlet opening 10 is arranged in a central area of the screw housing 5. Starting from the outlet opening 10, a tubular conveyor pipe 18 runs to the collection device 9.

Through the lateral feed of the excrement from the outside to the center of the screw housing 5, where the outlet opening 10 is located, a positive pressure is generated in this area of the screw housing 5, whereby the animal excrement picked up can be conveyed further to the collection device 9 via the outlet opening 10 and the conveyor pipe 18 by the pressure being generated in the screw housing 5 alone.

At the ends of the screw housing 5 of the pick-up device 4, slide devices 15 in the form of skids are arranged at the bottom, on which the device 1 can be supported against the ground surface 3 and which make a low-friction propulsion of the device 1 possible.

A pointed guide device 16 for feeding the animal excrement to be picked up to the first pick-up opening 11 and second pick-up opening 12 is arranged on the screw housing 5 between the first pick-up opening 11 and the second pick-up opening 12. In this connection, guide mechanisms 17 arranged at an angle to the screw housing 5 are additionally arranged at the ends of the screw housing 5.

Figure 5:
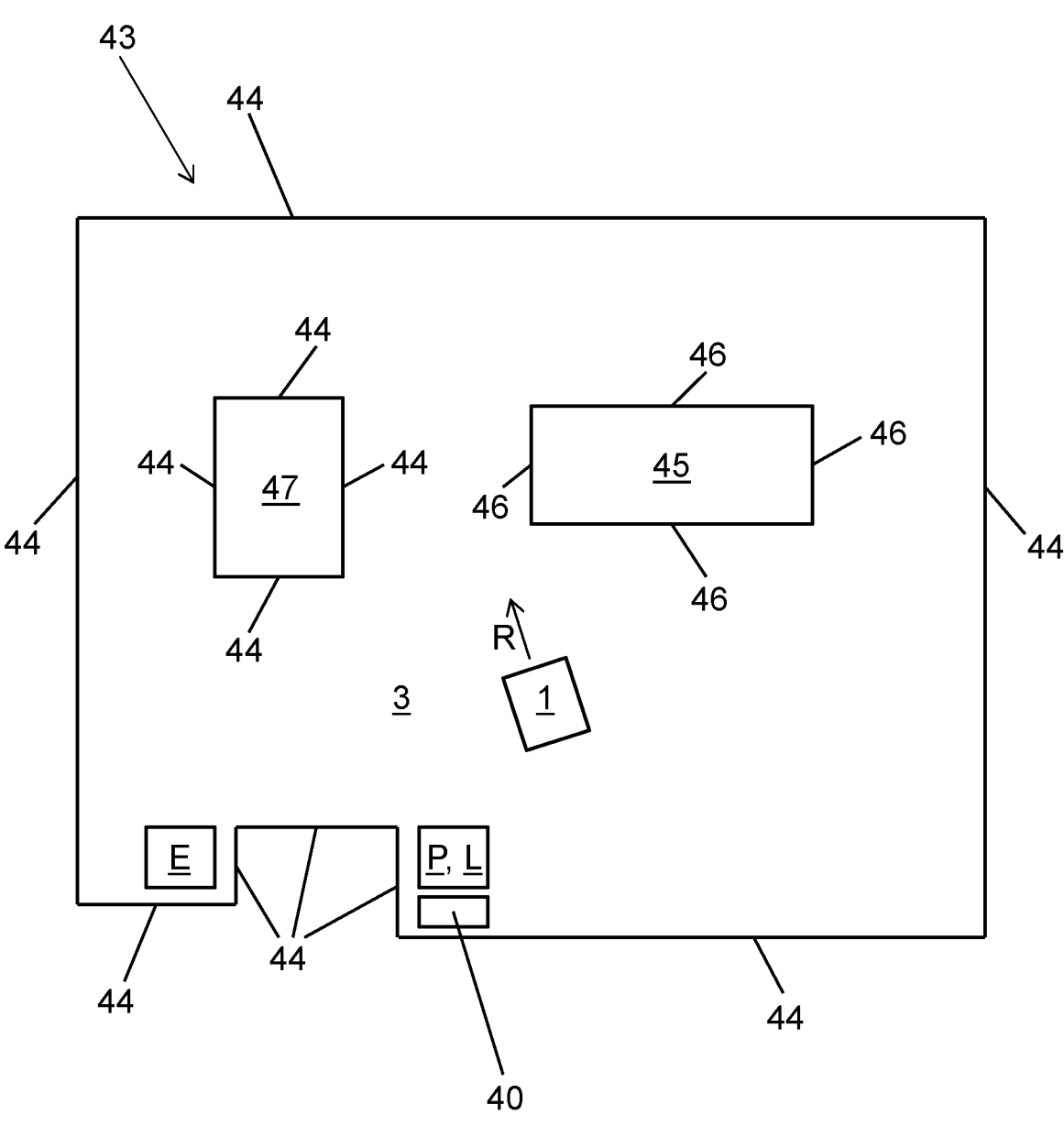
FIG. 5 is a schematic representation of a livestock building.

FIG. 5 shows a schematic representation of a livestock building 43 in the form of a plan of the livestock building 43 in a top view. The livestock building 43 comprises walls 44, which delimit the livestock building 43, an area for cubicles 45 for cows and a room 47. The room 47 is delimited by walls 44 and the area for the cubicles 45 has upstands 46 at its outer edge. The ground surface 3 of the livestock building 43 is a traversable, solid concrete floor. A proposed device 1 moves on the ground surface 3 in order to pick up animal excrement from the ground surface 3. An emptying position E, which can be driven to autonomously by the device 1 in order to empty the animal excrement picked up, is marked on the plan of the livestock building 43. A parking position P and a charging position L are likewise marked, wherein parking position P and charging position L are located at the same point in the livestock building 43. These positions can also be driven to autonomously by the device 1. A charging station 40 is arranged next to the charging position L, in order to be able to charge energy storage devices of the device 1 when the latter is located in the charging position L.

For propulsion and orientation, the device 1 comprises a propulsion device 2 (e.g. comprising two drivable drive wheels 29), a control device 31 and a navigation mechanism 32 (these components are not represented in more detail here). A position-dependent navigation of the device 1 is thus made possible. The navigation mechanism 32 can be a navigation mechanism based on an indoor navigation system, which uses, for example, WLAN or Bluetooth for position determination. Through a position-dependent control of the propulsion device 2 by the control device 31, specific positions or position paths can be predefined, which can be driven to or on autonomously by the device 1. Thus, position data (e.g. route, parking position P, charging position L, emptying position E) for the device 1 can be stored in the control device 31 and the control device 31 can, in conjunction with the navigation mechanism 32, ensure that the device 1 autonomously drives to or on the predefined position data by controlling the drive wheels 29 depending on the position data and on navigation data of the navigation mechanism 32.

To determine distances of the device 1 from the walls 44 of the livestock building 43 or of the room 47 or from the upstands 46 of the area of the cubicles 45, the device 1 can be equipped with distance sensors 33.

LIST OF REFERENCE NUMBERS

1 device for picking up animal excrement
2 propulsion device
3 ground surface
4 pick-up device
5 screw housing
6 screw conveyor
7 first conveyor section
8 second conveyor section
9 collection device
10 outlet opening
11 first pick-up opening
12 second pick-up opening 13 opening height
14 housing height
15 slide device
16 guide device
17 guide mechanism
18 conveyor pipe
19 conveyor device
20 fill-level sensor
21 cover
22 emptying opening
23 water tank
24 rinsing mechanism
25 spraying mechanism
26 detection device
27 flap
28 energy storage device
29 drive wheel
30 drive motor
31 control device
32 navigation mechanism
33 distance sensor
34 contact sensor
35 water intake
36 spring
37 heating band
38 drive unit
39 drive mechanism
40 charging station
41 slide rail
42 heat sensor
43 livestock building
44 wall
45 area for cubicles
46 upstand
47 room
48 sensor strip
49 rubber lip
R direction of travel
F1 first conveying direction
F2 second conveying direction
P parking position
L charging position
E emptying position

The invention claimed is:

1. A device for picking up animal excrement, comprising:
a propulsion device for propelling the device on a traversable ground surface,
a pick-up device including a screw housing and a drivable screw conveyor arranged in the screw housing and extending in a longitudinal direction for picking up animal excrement located on the ground surface, the screw conveyor having a longitudinal axis and including a first conveyor section with a first conveying direction and a second conveyor section with a second conveying direction arranged along the longitudinal axis, the second conveying direction running counter to the first conveying direction such that the first conveying direction and the second conveying direction converge towards each other, and
a collection device for collecting the animal excrement picked up by the pick-up device, the collection device being connected to an outlet opening of the screw housing arranged between the first conveyor section and the second conveyor section,
wherein the screw housing includes a first pick-up opening in the area of the first conveyor section, a second pick-up opening in the area of the second conveyor section, and the outlet opening, the screw housing having a central section between the first pick-up opening and the second pick-up opening, the central section entirely surrounding the section of the screw conveyor between the first pick-up opening and the second pick-up opening except for the outlet opening formed therein.

2. The device according to claim 1, wherein the screw housing is tubular.

3. The device according to claim 1, wherein the first pick-up opening and the second pick-up opening are arranged at opposite ends of the screw housing.

4. The device according to claim 1, wherein the first pick-up opening extends, starting from an outer end of the first conveyor section with respect to a widthwise direction of the pick-up device, along approximately 20% to approximately 80% of the first conveyor section, and/or the second pick-up opening extends, starting from an outer end of the second conveyor section with respect to a widthwise direction of the pick-up device, along approximately 20% to approximately 80% of the second conveyor section.

5. The device according to claim 1, wherein an opening height of the first pick-up opening and/or an opening height of the second pick-up opening corresponds to approximately 30% to approximately 100% of a housing height of the screw housing.

6. The device according to claim 1, wherein a slide device is arranged on the screw housing.

7. The device according to claim 1, wherein the screw housing includes a guide device for feeding the animal excrement to be picked up to the first pick-up opening and/or the second pick-up opening, the guide device being arranged between the first pick-up opening and the second pick-up opening.

8. The device according to claim 1, further comprising guide mechanisms arranged at an angle to the screw housing, and each arranged at a respective end of the screw housing.

9. The device according to claim 1, further comprising a conveyor pipe connecting the outlet opening to the collection device.

10. The device according to claim 1, wherein the collection device includes a conveyor device.

11. The device according to claim 1, wherein the collection device includes a fill-level sensor.

12. The device according to claim 1, wherein the collection device has an emptying opening to be sealed by a cover.

13. The device according to claim 1, further comprising a water tank.

14. The device according to claim 13, wherein the collection device includes a rinsing mechanism connected to the water tank for rinsing the collection device.

15. The device according to claim 13, further comprising a spraying mechanism connected to the water tank for applying water to the ground surface.

16. The device according to claim 1, further comprising a detection device for detecting a quantity of animal excrement to be picked up.

17. The device according to claim 16, wherein the detection device is a flap arranged movably on the pick-up device above the first pick-up opening and the second pick-up opening and extending in front of the first pick-up opening and the second pick-up opening.

18. The device according to claim 1, further comprising an energy storage device for power supply.

19. The device according to claim 1, wherein the propulsion device includes at least two drivable drive wheels.

20. The device according to claim 19, wherein each of the drive wheels is drivable via a respective drive motor.

21. The device according to claim 19, wherein the propulsion device includes a control device for controlling the at least two drive wheels.

22. The device according to claim 21, wherein a predefined or predefinable movement path is to be stored in the control device, the control device being configured to control the at least two drive wheels depending on the movement path.

23. The device according to claim 21, wherein the propulsion device includes a navigation mechanism and predefined or predefinable position data are to be stored in the control device, the control device being configured to control the at least two drive wheels depending on the position data and on navigation data from the navigation mechanism.

24. The device according to claim 23, wherein the position data include a route.

25. The device according to claim 23, wherein the position data include a parking position and/or a charging position and/or a water-supplying position and/or an emptying position.

26. The device according to claim 1, further comprising a distance sensor.

27. The device according to claim 1, further comprising a contact sensor.

28. The device according to claim 6, wherein the slide device is a skid.

29. The device according to claim 20, wherein each respective drive motor has an incremental encoder.

30. A device for picking up animal excrement, comprising:
   a propulsion device for propelling the device on a traversable ground surface,
   a pick-up device including a screw housing and a drivable screw conveyor arranged in the screw housing and extending in a longitudinal direction for picking up animal excrement located on the ground surface, the screw conveyor having a longitudinal axis and including a first conveyor section with a first conveying direction and a second conveyor section with a second conveying direction arranged along the longitudinal axis, the second conveying direction running counter to the first conveying direction, and
   a collection device for collecting the animal excrement picked up by the pick-up device, the collection device being connected to an outlet opening of the screw housing arranged between the first conveyor section and the second conveyor section, wherein the screw housing includes a first pick-up opening in the area of the first conveyor section, a second pick-up opening in the area of the second conveyor section, and the outlet opening, the screw housing having a central section between the first pick-up opening and the second pick-up opening, the central section entirely surrounding the section of the screw conveyor between the first pick-up opening and the second pick-up opening except for the outlet opening formed therein, and
   wherein the pick-up device is configured to convey the animal excrement laterally from width-wise outer sides of the pick-up device toward a center of the pick-up device where the outlet opening of the screw housing is located.

31. A device for picking up animal excrement, comprising:
   a propulsion device for propelling the device on a traversable ground surface,
   a pick-up device including a screw housing and a drivable screw conveyor arranged in the screw housing and extending in a longitudinal direction for picking up animal excrement located on the ground surface, the screw conveyor having a longitudinal axis and including a first conveyor section with a first conveying direction and a second conveyor section with a second conveying direction arranged along the longitudinal axis, the second conveying direction running counter to the first conveying direction, and
   a collection device for collecting the animal excrement picked up by the pick-up device, the collection device being connected to an outlet opening of the screw housing arranged between the first conveyor section and the second conveyor section, wherein the screw housing includes a first pick-up opening in the area of the first conveyor section, a second pick-up opening in the area of the second conveyor section, and the outlet opening, the screw housing having a central section between the first pick-up opening and the second pick-up opening, the central section entirely surrounding the section of the screw conveyor between the first pick-up opening and the second pick-up opening except for the outlet opening formed therein,
   wherein the first pick-up opening and the second pick-up opening are arranged at opposite width-wise sides of the screw housing, and the outlet opening is arranged in a central area of the screw housing.

* * * * *